United States Patent Office 2,911,339
Patented Nov. 3, 1959

2,911,339

STREPTOMYCES AUREOFACIENS FERMENTATION PROCESS

Joseph Jacob Goodman, Nanuet, N.Y., assignor to American Cyanamid Company, New York, N.Y., a corporation of Maine No Drawing. Application November 27, 1957
Serial No. 699,157

11 Claims. (Cl. 195—80)

This invention relates to a process for the production of antibiotics elaborated by the microorganism *Streptomyces aureofaciens* in a medium containing a glyceride oil and starch.

A principal object of the invention is to increase the yield and to reduce the cost of production of the tetracycline antibiotics which are produced by growing the organism *Streptomyces aureofaciens* in an aqueous nutrient medium.

Antibiotics which are elaboration products of various microorganisms have become of increasing importance to the welfare of the human race within the past few years. Many antibiotics have been discovered, several of which have become of great economic importance; and the effort to reduce the cost of each in order to make it more economically available has been an outstanding example of research.

Each organism has its own peculiar characteristics; and just as each organism differs in appearance and classification from every other organism, so do the optimum conditions for the production of a particular elaboration product by each organism. Even with a particular organism, peculiar inter-actions between the components of the medium often appear in a seemingly inexplicable fashion.

The organism *Streptomyces aureofaciens* is described in a United States patent to Benjamin M. Duggar, 2,482,055, entitled Aureomycin and Preparation of the Same. Certain media suitable for the propagation of this organism are described in a United States patent to Joseph G. Niedercorn, 2,609,329, entitled Process for Producing Aureomycin.

In the known processes for producing chlortetracycline, tetracycline, and bromtetracycline by the propagation of *Streptomyces aureofaciens* in an aqueous culture medium, three classes of materials are required for the maximum production of antibiotics:

(1) An organic nitrogen source such as corn steep liquor.

(2) A carbohydrate such as starch or sugar; in the present invention starch is used as the carbohydrate.

(3) An inorganic supplement containing the inorganic ions, ammonium, cobalt, ferrous magnesium, manganous potassium, zinc, chloride, phosphate and sulfate; and a quantity of an alkaline earth ion, preferably calcium. Calcium carbonate is particularly suitable as it also stabilizes the pH within the desired range.

The medium is prepared by mixing together with a group of salts which will yield the desired inorganic ions, the starch and corn steep liquor, and cooking sufficiently to destroy contaminating microorganisms, then cooling, inoculating and fermenting.

While glyceride oils such as lard oil have been used with higher alcohols for the purpose of foam inhibiting, as for example disclosed in the Duggar Patent No. 2,482,055, column 7, lines 54–56, such use indicates only the addition of small quantities, usually from about 2 to 3 grams of oil per liter of medium; and this lard oil is added as required to prevent foaming, mostly during the later stages of the fermentation.

When starch is used as a principal source of carbohydrate, it is found that from 5 to 60 grams of glyceride oil per liter of medium will result in increased yields of antibiotic. The mechanism by which the oil acts to give increased yields is not understood. It is convenient to add the oil to the medium before it is cooked (sterilized), although the oil may be added by aseptic procedures to the otherwise complete medium either before or just after its inoculation. For best results, the oil should be added not appreciably later than the time at which the medium is inoculated. Additional quantities of the same oil as is used as a nutrient may be added later for foam control if desired.

The improvement which results from adding the glyceride oil to a starch-based medium is particularly surprising because the same oil when added to a sugar-based medium in the same quantities does not increase the yield of chlortetracycline. In a series of runs under comparable conditions, a yield of about 1500 milligrams of chlortetracycline per liter was obtained with sucrose as the carbohydrate. When 20 grams per liter of lard oil was introduced prior to fermentation, the yield dropped to approximately 1000 milligrams of chlortetracycline per liter. With a fluidized starch, an initial yield of 2000 milligrams of chlortetracycline per liter was obtained. Upon the addition of 20 grams per liter of lard oil, the yield of chlortetracycline increased to 3000 milligrams per liter.

If a mixture of starch and sugar is used as the carbohydrate, the yield of chlortetracycline obtained may be lower than that obtained with either alone.

The glyceride oils which may be used in practicing the present invention include oils such as lard oil, corn oil, peanut oil, cottonseed oil, soya bean oil, olive oil, sperm oil, palm oil, whale oil, glyceryl monostearate and glyceryl monooleate. These oils tend to break down partially in the fermentation and assist in controlling the pH. A considerable portion of the oil may be isolated after the fermentation cycle, but this residue has different characteristics than the oil that was added, apparently due to the enzymatic action during the fermentation.

To illustrate the advantageous effects of adding a glyceride oil to a chlortetracycline fermentation in which starch is used as the carbohydrate, a series of experimental fermentations was run using a conventional-type fermentation medium containing about 25 grams per liter of corn steep liquor, 30 grams per liter of lard oil and essential mineral salts. The several fermentations contained lard oil, the preferred glyceride oil of the invention, in varying amounts as indicated in the following table. The yield of chlortetracycline in the control fermentation—that is, the one in which no lard oil was included—was taken as a basis for comparison and given the rating of 100. The results are as follows:

TABLE I

| Percent Lard Oil by Weight | Relative Yield Chlortetracycline |
|---|---|
| 0.0 | 100 |
| 0.5 | 180 |
| 1.0 | 190 |
| 1.5 | 165 |
| 2.0 | 190 |
| 2.5 | 250 |
| 3.0 | 245 |

As will be seen from the above results, the addition of lard oil resulted in an increase in the chlortetracycline production in these controlled and comparable fermentations.

The highest yields of antibiotic that have been obtained in numerous experimental fermentations were with a medium containing from 20 to 30 grams of lard oil and 50 to 60 grams of starch per liter of medium. Improved results are obtained by adding from about 5 to 60 grams of glyceride oil per liter of medium containing 30 to 100 grams of starch.

Whereas the results obtained in laboratory experimental shaker flasks and small-scale experimental fermentation tanks are indicative of the results to be expected, the most satisfactory criterion is the production of antibiotic in large production-size equipment. It is found that in production, for example, tanks containing at least 100 gallons of medium, uniformly superior results are obtainable through the use of a starch-lard oil composition. The setting of many commercial tanks has confirmed experimental results obtained on a small scale and shown unequivocally that the use of a starch-lard oil fermentation medium increases the general average of chlortetracycline production.

Example I

A group of fermentors of commercial size were charged with a fermentation medium prepared by mixing at four-fold concentration sufficient ingredients to give a final mash having therein 30 grams per liter of corn steep liquor, 50 percent solids, penicillin grade, 30 grams of starch, 9 grams per liter of calcium carbonate U.S.P., 3.3 grams of ammonium sulfate, 1 gram of ammonium chloride, 2 grams of magnesium chloride hexahydrate, 100 milligrams of zinc sulfate heptahydrate, together with traces of iron, manganese, and cobalt and 10 grams of lard oil (Armour's extra-winter strain). The mash was cooked at 120° C. for thirty minutes, cooled and diluted to volume with sterile water. The tanks were inoculated with 40 milliliters per liter from a seed tank. The tanks were aerated and stirred with additional lard oil being added as required to prevent foaming and then harvested after approximately 60 hours, the fermentation being at 27° C. Average yields of 2500 milligrams of chlortetracycline per liter were obtained. Average yields of the order of 1800 milligrams per liter are obtained when the lard oil is omitted, under otherwise identical conditions.

Example II

A series of tests to determine the effects of glyceride oils as a source of energy in comparison and in conjunction with starch and other ingredients of fermentation media in which strains of Streptomyces aureofaciens were used for the production of chlortetracycline was conducted.

A basal medium was made up as follows:

| | | |
|---|---|---|
| Corn steep liquor | g./l | 25.0 |
| CaCO$_3$ | g./l | 9.0 |
| (NH$_4$)$_2$SO$_4$ | g./l | 5.6 |
| NH$_4$Cl | g./l | 1.7 |
| MnSO$_4$ (technical) | mg./l | 80.0 |
| CoCl$_2$.6H$_2$O | mg./l | 5.0 |

To aliquots of this medium were added various energy sources (exclusive of the corn steep liquor which was common to all the variables) as follows:

| | Cal./l |
|---|---|
| Starch 60 g./l | 252,000 |
| Lard oil 30 ml./l | 279,000 |
| Starch 60 g./l. + lard oil 30 ml./l | 531,000 |
| Sucrose 60 g./l | 252,000 |
| Sucrose 60 g./l. + lard oil 30 ml./l | 531,000 |
| Glucose 60 g./l | 252,000 |
| Glucose 60 g./l. + lard oil 30 ml./l | 531,000 |

Also to provide 531,000 cal.

| | | |
|---|---|---|
| Lard oil | ml./l | 57 |
| Starch | g./l | 125 |
| Sucrose | g./l | 125 |
| Glucose | g./l | 125 |

The media were dispensed in 25-milliliter amounts in 250-milliliter Erlenmeyer flasks, cotton plugged and sterilized.

After sterilization, they were inoculated with 4 percent by volume of a 24-hour vegetative shaken culture of Streptomyces aureofaciens Strain S77 and incubated at 26.5° C. on a rotary shaker (185 r.p.m.) for 96 hours, after which they were assayed for chlortetracycline content.

The flasks containing starch, sucrose or glucose as the "sole" carbon source also had in addition three drops (0.6 percent) of mineral oil added as antifoam.

The results are presented in the following table:

| Energy source | Cal./l. | CTC γ/Ml. |
|---|---|---|
| (1) Starch 60 g./l.* | 252,000 | 2,750 |
| (2) Lard Oil 30 ml./l | 279,000 | 90 |
| (3) Starch 60 g./l.+Lard Oil 30 ml./l | 531,000 | 5,500 |
| (4) Sucrose 60 g./l.* | 252,000 | 1,390 |
| (5) Sucrose 60 g./l.+Lard Oil 30 ml./l | 531,000 | 1,740 |
| (6) Glucose 60 g./l.* | 252,000 | 595 |
| (7) Glucose 60 g./l.+Lard Oil 30 ml./l | 531,000 | 20 |
| (8) Lard Oil 57 ml./l | 531,000 | 120 |
| (9) Starch 125 g./l.* | 531,000 | 3,125 |
| (10) Glucose 125 g./l.* | 531,000 | 20 |
| (11) Glucose 125 g./l.* | 531,000 | 10 |

* Three drops mineral oil/flask as antifoam.

As will be seen from the above results, lard oil is not a satisfactory substitute for starch in fermentations with Streptomyces aureofaciens wherein chlortetracycline is produced either on the basis of caloric content or optimum antibiotic production. On the other hand, when lard oil is used to supplement starch, substantially increased yields of chlortetracycline are produced by the fermentation but the addition of lard oil to fermentation media containing sucrose and glucose does not result in any appreciable increase in the antibiotic production. In other experiments, using other media and other strains of Streptomyces aureofaciens, the addition of lard oil to a starch-containing medium definitely increased (more than double) the production of chlortetracycline and had little effect in a sucrose-containing medium. In fact, in some cases a depression in the production of chlortetracycline was observed.

Example III

To show the non-equivalence of various carbohydrates in processes of producing chlortetracycline by means of the organism Streptomyces aureofaciens, a number of experimental fermentations were run. A basal medium of the following composition was prepared.

| | | |
|---|---|---|
| Corn steep liquor | g./l | 30.0 |
| CaCO$_3$ | g./l | 9.0 |
| (NH$_4$)$_2$SO$_4$ | g./l | 3.3 |
| MgCl$_2$.6H$_2$O | g./l | 2.0 |
| NH$_4$Cl | g./l | 1.0 |
| FeSO$_4$.7H$_2$O | mg./l | 60.0 |
| MnSO$_4$.4H$_2$O | mg./l | 50.0 |
| ZnSO$_4$.7H$_2$O | mg./l | 100.0 |
| CoCl.6H$_2$O | mg./l | 5.0 |

To this was added 30 grams per liter or its equivalent of the following carbohydrates:

(1) Corn starch.
(2) Enzyme hydrolyzed corn starch.
(3) Acid hydrolyzed starch.
(4) Sucrose.
(5) Glucose.
(6) Maltose.

Flasks containing 25 milliliters of medium and three drops of mineral oil in a 250-milliliter Erlenmeyer flask were sterilized by heating at 120° C. for fifteen minutes and inoculated with 4 percent of a twenty-four hour culture of Streptomyces aureofaciens grown in a medium consisting of:

|  | G./l. |
|---|---|
| Steep liquor | 30 |
| Sucrose | 30 |
| $CaCO_3$ | 7 |
| $(NH_4)_2SO_4$ | 2 |

After inoculation, the flasks were shaken on a rotary shaker (185 revolutions per minute, 2-inch throw) for seventy-two hours, after which they were assayed fluorometrically for chlortetracycline. The following results were obtained:

|  | γ/ml. CTC |
|---|---|
| Corn starch | 2085 |
| Enzyme hydrolyzed raw starch | 1740 |
| Acid hydrolyzed raw starch | 1320 |
| Sucrose | 970 |
| Glucose | 1040 |
| Maltose | 115 |

As will be seen from these results, corn starch gave considerably better results than any of the other carbohydrates. Hydrolysis of the starch which tends to break it down to the more simple carbohydrates lowers its effectiveness. Sucrose, glucose and maltose are less effective than the starch and are not equivalent to each other in this particular fermentation. The invention is not limited to any particular starch. The starch cells are, of course, ruptured during the sterilization process; but as seen from the above results, the starch should not be degraded so far as to lose its essential characteristics as a polysaccharide.

*Example IV*

A basal medium similar to that described in Example III but containing 3 percent by weight of starch and 20 grams of corn steep liquor per liter of medium was prepared, sterilized and inoculated with *Streptomyces aureofaciens* and fermented for seventy-two hours as in Example III. Two series of these fermentations were run. Various amounts of lard oil were added to the several flasks; and at the end of the fermentation period, the chlortetracycline content of the fermentation liquor was determined with the following results:

TABLE II

| Percent Lard Oil | Chlortetracycline γ/Ml. | |
|---|---|---|
| | Run A | Run B |
| 0.0 | 1,505 | |
| 0.5 | 2,605 | |
| 1.0 | 2,760 | |
| 1.5 | 2,960 | 3,255 |
| 2.0 | 3,375 | 3,880 |
| 2.5 | | 3,500 |
| 3.0 | | 3,450 |
| 3.5 | | 3,500 |

As will be seen from the above, the addition of glyceride oil to the starch medium resulted in increased yields of chlortetracycline.

*Example V*

In still another series of fermentations, it was shown that the addition of lard oil to fermentation media containing fluidity starch also resulted in increased yields of chlortetracycline.

TABLE III

| Percent Lard Oil | 3 Percent Raw Starch, γ/ml. CTC | 3 Percent Fluidity Starch, γ/ml. CTC |
|---|---|---|
| 0.0 | 1,435 | 1,535 |
| 0.5 | 2,635 | 2,300 |
| 1.0 | 2,735 | 2,735 |
| 1.5 | 2,400 | 2,835 |
| 2.0 | 2,735 | 2,665 |
| 2.5 | 3,635 | 4,100 |
| 3.0 | 3,565–4,150 | |

*Example VI*

In another experimental fermentation in which 3 percent sucrose was used as the carbohydrate, the addition of increasing amounts of lard oil resulted in decreased yields of chlortetracycline as is shown in the following table.

TABLE IV

| Lard Oil, Percent | 3 Percent Sucrose, γ/ml. CTC |
|---|---|
| 0.4 | 1,385 |
| 0.8 | 1,275 |
| 1.2 | 1,180 |
| 1.6 | 870 |
| 2.0 | 580 |

*Example VII*

A study was made of the effects of increasing the amount of carbohydrate energy in the medium by adding increasing amounts of starch. The particular medium contained 20 grams per liter of corn steep liquor and varying amounts of starch, as is shown in the following table.

TABLE V

| | γ/ml. CTC at 72 hours |
|---|---|
| 3% starch | 2615 |
| 4% starch | 2640 |
| 5% starch | 2305 |
| 6% starch | 2240 |

This particular series of fermentations shows that an increase in the amount of starch does not necessarily result in an increased yield of antibiotic. It is pointed out, however, that with particularly selected strains of *Streptomyces aureofaciens* and special fermentation conditions it may be advantageous to use amounts of starch as high as 10 percent, particularly in conjunction with the use of glyceride oils.

*Example VIII*

Glyceride oils by themselves are not an adequate source of energy for a *Streptomyces aureofaciens* fermentation. This was demonstrated by a series of experiments in which a fermentation medium adequate in all respects for the production of several thousand units per milliliter of chlortetracycline was employed, but being devoid of carbohydrates. Lard oil in increasing amounts was added to the medium as a possible source of energy as a substitute for carbohydrates. The results of this series of fermentations is shown in the following table:

TABLE VI

| Lard oil percent: | γ/ml. CTC at 72 hours |
|---|---|
| 0.0 | 80 |
| 1.0 | 95 |
| 2.0 | 115 |
| 3.0 | 180 |

Obviously carbohydrates are necessary. The lard oil cannot replace the carbohydrate requirements of a *Streptomyces aureofaciens* fermentation.

*Example IX*

The advantages of using glyceride oils to supplement starch in a *Streptomyces aureofaciens* fermentation is not restricted to those fermentations in which chlortetracycline is the principal antibiotic. Tetracycline can be produced by fermentation of an aqueous nutrient medium with *Streptomyces aureofaciens* by restricting the chloride ion content of the medium; and bromotetracycline can be produced by restricting the chloride ion content of the medium and supplying bromide ions to the fermentation. It has been found that it is advantageous to supplement the starch in such fermentations by glyceride oils, just as in the case of those fermentations in which chlortetracycline is produced as the principal antibiotic. The may be illustrated by the following fermentation in which a fermentation medium having the following composition was prepared.

| | | |
|---|---|---|
| Chloride free starch | g./l. | 55 |
| Silver dehalogenated steep liquor | g./l. | 30 |
| $(NH_4)_2SO_4$ | g./l. | 5 |
| $MgSO_4$ | g./l. | 2 |
| $CaCO_3$ | g./l. | 7 |
| Cottonseed meal | g./l. | 5 |
| $H_3PO_4$ | mg./l. | 40 |
| $MnSO_4 \cdot 4H_2O$ | mg./l. | 50 |
| $FeSO_4 \cdot 7H_2O$ | mg./l. | 60 |
| $ZnSO_4 \cdot 7H_2O$ | mg./l. | 100 |

To aliquots of the medium were added varying proportions of lard oil, as will be shown in the table below. The medium was sterilized and then inoculated with a strain of *Streptomyces aureofaciens* which is a good producer of tetracycline. At the end of ninety-six hours of fermentation, the medium was examined for chlortetracycline and tetracycline antibiotic content with the following results:

| Percent Lard Oil | Chlortetracycline, Gammas/Ml. | Tetracycline, Gammas/Ml. |
|---|---|---|
| 0.0 | 70 | 1,800 |
| 1.0 | 40 | 4,510 |
| 1.5 | 30 | 5,050 |
| 2.0 | 25 | 5,610 |

From the above results and others which have been obtained in the laboratory, it is evident that the addition of a glyceride oil to a *Streptomyces aureofaciens* fermentation in which normal amounts of starch are used as the source of carbohydrate will result in increased yields of the total antibiotic content of the medium whether it is chlortetracycline or one of the other tetracycline antibiotics known to be produced by *Streptomyces aureofaciens*. The invention is not, therefore, to be restricted to production of any particular antibiotic but rather is concerned with the advantageous results that are obtained when a glyceride oil is used to supplement, not replace, the normal amounts of starch that are used in *Streptomyces aureofaciens* fermentations.

This application is a continuation-in-part of my application Serial No. 347,174, filed April 6, 1953.

What I claim is:

1. In a process of producing antibiotics by aerobic fermentation of an aqueous nutrient medium by microorganisms of the species *Streptomyces aureofaciens*, the improvement which comprises supplying to said medium from 30 to 100 grams per liter of starch and 5 to 60 grams of glyceride oil per liter of medium.

2. In a process of producing chlortetracycline by aerobic fermentation of an aqueous nutrient medium by microorganisms of the species *Streptomyces aureofaciens*, the improvement which comprises supplying to said medium from 30 to 100 grams per liter of starch and 5 to 60 grams of glyceride oil per liter of medium.

3. In a process of producing tetracycline by aerobic fermentation of an aqueous nutrient medium by microorganisms of the species *Streptomyces aureofaciens*, the improvement which comprises supplying to said medium from 30 to 100 grams per liter of starch and 5 to 60 grams of glyceride oil per liter of medium.

4. In a process of producing antibiotics by aerobic fermentation of an aqueous nutrient medium by microorganisms of the species *Streptomyces aureofaciens*, the improvement which comprises supplying to said medium starch in sufficient quantity to supply the normal carbohydrate requirements of the fermentation and 5 to 60 grams of glyceride oil per liter of medium.

5. A process in accordance with claim 4 in which the glyceride oil is lard oil.

6. A process in accordance with claim 4 in which the glyceride oil is corn oil.

7. A process in accordance with claim 4 in which the glyceride oil is peanut oil.

8. A process in accordance with claim 4 in which the glyceride oil is cottonseed oil.

9. A process in accordance with claim 4 in which the glyceride oil is soya bean oil.

10. In a process of producing chlortetracycline by aerobic fermentation of an aqueous nutrient medium by microorganisms of the species *Streptomyces aureofaciens*, the improvement which comprises supplying to said medium from 50 to 60 grams per liter of starch and 20 to 30 grams of glyceride oil per liter of medium.

11. In a process of producing tetracycline by aerobic fermentation of an aqueous nutrient medium by microorganisms of the species *Streptomyces aureofaciens*, the improvement which comprises supplying to said medium from 50 to 60 grams per liter of starch and 20 to 30 grams of glyceride oil per liter of medium.

References Cited in the file of this patent

UNITED STATES PATENTS

| 2,482,055 | Duggar | Sept. 13, 1949 |
| 2,516,080 | Sobin et al. | July 18, 1950 |

FOREIGN PATENTS

| 679,087 | Great Britain | Sept. 10, 1952 |
| 781,843 | Great Britain | Aug. 28, 1957 |